(12) United States Patent
Kim

(10) Patent No.: US 7,069,409 B2
(45) Date of Patent: Jun. 27, 2006

(54) SYSTEM FOR ADDRESSING A DATA STORAGE UNIT USED IN A COMPUTER

(75) Inventor: Seong Yong Kim, Gwangju (KR)

(73) Assignee: Grape Technology, Inc., Seoul (KR)

( * ) Notice: Subject to any disclaimer, the term of this patent is extended or adjusted under 35 U.S.C. 154(b) by 590 days.

(21) Appl. No.: 10/002,315

(22) Filed: Oct. 25, 2001

(65) Prior Publication Data

US 2002/0083288 A1    Jun. 27, 2002

(30) Foreign Application Priority Data

Oct. 25, 2000    (KR) ............................... 2000-63039

(51) Int. Cl.
*G06F 13/00*    (2006.01)
(52) U.S. Cl. .................. 711/173; 711/167; 711/170
(58) Field of Classification Search ............... 711/173, 711/167, 170, 154
See application file for complete search history.

(56) References Cited

U.S. PATENT DOCUMENTS

| | | | |
|---|---|---|---|
| 5,379,384 A | | 1/1995 | Solomon ................ 710/312 |
| 5,734,848 A | * | 3/1998 | Gates et al. ............. 710/315 |
| 5,999,743 A | * | 12/1999 | Horan et al. ............. 710/56 |
| 6,044,225 A | | 3/2000 | Spencer et al. ........... 710/52 |
| 6,076,128 A | * | 6/2000 | Kamijo et al. ............ 710/312 |
| 6,633,296 B1 | * | 10/2003 | Laksono et al. .......... 345/502 |

FOREIGN PATENT DOCUMENTS

| | | |
|---|---|---|
| KR | 1997-7654 | 2/1997 |
| KR | 1997-7655 | 2/1997 |
| KR | 1997-16918 | 4/1997 |
| KR | 1997-29077 | 6/1997 |
| KR | 1997-11888 | 7/1997 |
| KR | 1999-8415 | 1/1999 |
| KR | 2000-16944 | 3/2000 |

\* cited by examiner

*Primary Examiner*—Reba I. Elmore
(74) *Attorney, Agent, or Firm*—Jones Day

(57) ABSTRACT

Disclosed is a system, which divides a memory into a plurality of equally-sized sub-memories and controls an address of each sub-memory, thereby significantly increasing the access speed to an auxiliary memory unit, which includes a SCSI (Small Computer System Interface) controller for converting a format of data on a SCSI interface bus so that the data are accessed on a PCI(Peripheral Component Interconnect) interface bus for use in the system, a memory card module for storing data on the PCI interface bus therein, the memory card module being divided into a plurality of equally-sized memory blocks, and a CPU (Central Processing Unit) module for writing data on the PCI interface bus to the memory card module and reading out the data therefrom. The memory card module includes a PCI-to-memory controller, which is disposed between the PCI interface bus and the plurality of sub-memories as a bridge, for controlling access to the plurality of sub-memories, which is distributed in a hierarchical fashion.

6 Claims, 4 Drawing Sheets

SYSTEM FOR ADDRESSING A DATA STORAGE UNIT USED IN A COMPUTER

FIELD OF THE INVENTION

The present invention relates to an auxiliary storage device and, in particular, to a high-capacity auxiliary memory unit constructed with a memory such as SDRAM (synchronous dynamic random access memory) and a SCSI (small computer system interface) bus structure.

BACKGROUND OF THE INVENTION

As personal computers are widely used, a client and server system based on the personal computers now can handle tasks that were once possibly executed by a main frame computer system. Typically, a client and server system includes a high-speed server with a large-capacity auxiliary memory unit and a plurality of personal computers (clients). The server and personal computers are connected via a network, thereby allowing the clients to access the server. Specifically, each client has the ability to write and read information to and from the server and to exchange information with other clients connected to the network.

However, an increased number of clients create a bottleneck between a server and auxiliary memory units. As a result, access time would be longer and, worst, due to excessive load on the network, the network could be down or transmitted data could be lost.

In the client and server system, a hard disk drive (HDD) is dominantly used as an auxiliary memory unit. As is well known, the HDD is a large data storage device using magnetic disks. Data is stored to and read from a spinning disk by controllably positioning the read/write head over the disk. Thus, a reading/writing operation on the HDD requires a physical rotation of a motor and the lateral movement of the read/write head. In a server system such as game servers where tens of thousands of clients could simultaneously connect at one time, read and write requests from individual clients in the server can impose a serious load to the system. Servers with the HDD having a finite access time would not be able to handle ever increasing and faster data traffic. It could adversely affect the stabilization of the servers.

In a typical HDD, there is so-called access time, a time required to seek and change discs until a head is positioned over a sector. A drive motor is rotated to move the head over the sector where data is magnetically written and read. As is well known, while a high-performance SCSI bus provides a transmission rate of 320 Mega-bytes at the maximum, the HDD provides a transmission rate of 43 Mega-bytes at the maximum due to the aforementioned problems.

CPUs used in typical servers can address only up to several Giga-byte memory map ranges so that they cannot directly control a data storage capacity over tens of Giga-bytes reaching several Tera-bytes. Furthermore, the CPUs fail directly to drive a plurality of memories due to a fan-out between memory chips.

SUMMARY OF THE INVENTION

It is, therefore, a primary objective of the present invention to provide a system, which is capable of dividing a memory into a plurality of equally-sized sub-memories and controlling an address of each sub-memory, thereby significantly increasing the access speed to an auxiliary memory unit.

In accordance with a preferred embodiment of the present invention, there is provided a system for addressing a data storage unit used in at least one of server and client computers, which comprises: a converting unit for converting a format of data on an external bus in order that the data are accessed on an internal bus for use in the system; a memory card module connected to the internal bus for storing data on the internal bus, wherein the memory card module includes a memory module having a plurality of equally-sized memory blocks; and a processing unit for writing data on the internal bus to the memory module and reading out the data therefrom.

BRIEF DESCRIPTIONS OF THE DRAWINGS

The above and other objects and features of the present invention will become apparent from the following description of preferred embodiments given in conjunction with the accompanying drawings, in which.

DETAILED DESCRIPTION OF THE PRESENT INVENTION

Figure 1:
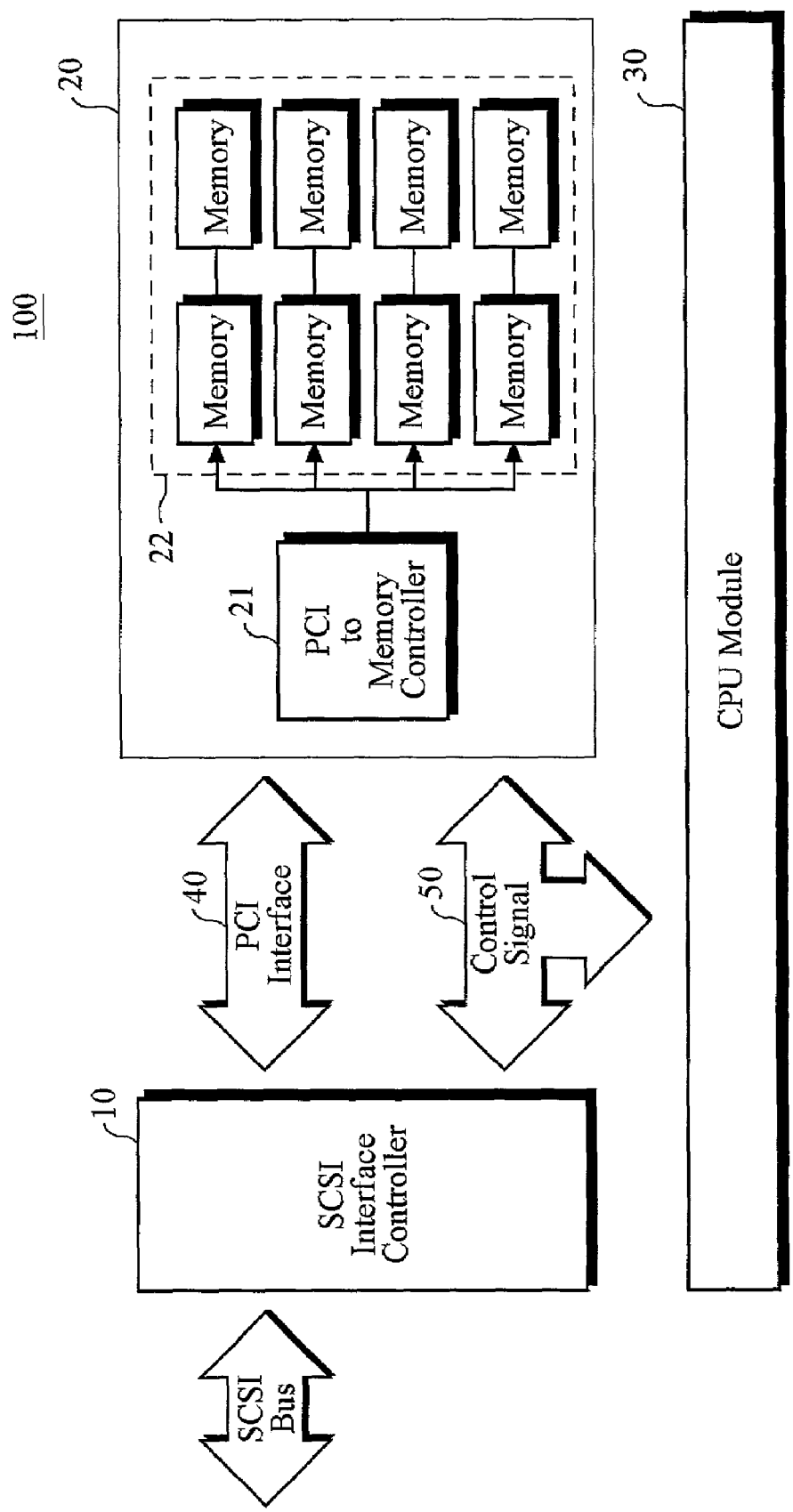
FIG. 1 is a schematic diagram of a memory addressing system in accordance with a preferred embodiment of the present invention.

Referring to FIG. 1, there is shown a schematic diagram of a memory addressing system in accordance with a preferred embodiment of the present invention. The memory addressing system 100 comprises a SCSI interface controller 10, a memory card module 20, a CPU module 30, a PCI interface bus 40, and a control signal bus 50. The SCSI interface controller 10 converts a format of data on an external SCSI (small computer system interface) bus so that the data are accessed on an internal PCI bus adapted to the memory addressing system 100, thereby allowing a SCSI bus command to be processed by the CPU module 30. As is well known, SCSI is one of the industry's standard interfaces that allows personal computers to communicate with peripheral devices, such as disk drives, tape drives, CD-ROM (compact disk-read only memory) drives, printers, and scanners, faster and more flexibly than previous interfaces. SCSI ports are built into most personal computers today and supported by all major operating systems. SCSI is more flexible than earlier parallel data transfer interfaces.

The CPU module 30 controls all components of the SCSI interface controller 10, manages the internal PCI bus, and converts information of a head, sector and cylinder representing position information of the HDD, and information of a track, sector and cluster representing format information of the HDD, which are inputted through the SCSI bus, into corresponding memory addresses.

The memory card module 20, which is composed of SDRAM, Rambus DRAM, DDR or other equivalent memories, includes a PCI-to-memory controller 21 and a plurality of memory modules (e.g., 22). Each of memory modules 22 has a plurality of memory blocks, and each memory block has four equally-sized sub-memories.

The PCI interface bus 40 and the control signal bus 50 are internal local buses for transmitting internal data and control signals and use the standard PCI 64-bit bus interface.

In accordance with the present invention, the memory module 22 has a hierarchical memory configuration, which includes the plurality of memory blocks, each memory block having a multiplicity of sub-memories, to prevent the fan-out problem. The fan-out problem occurs when signals outputted from an original signal line are divided onto a number of lines for transmission, resulting in a decreased signal voltage. In a high-capacity memory, the division of signals from the original signal lines is increased so that signals to be directed to each memory are eventually attenuated.

With the tree structure of the hierarchical memory configuration in accordance with the present invention, signals are compensated at intermediate stages such as the memory module and the memory block and forwarded to lower levels such as the sub-memories, thereby eliminating signal loss problems. Clock delay required for the hierarchical memory configuration to compensate the signals is in turn compensated by the PCI-to-memory controller 21.

Because the PCI-to-memory controller 21 controls the memory module 22 distributed in a hierarchical memory configuration, it can drive a physical memory that is actually accessed while the rest of memories maintains in a low-power mode. As a result, power used to drive the memories is reduced, so that a back-up batter power keeps up for a longer time.

Figure 2:
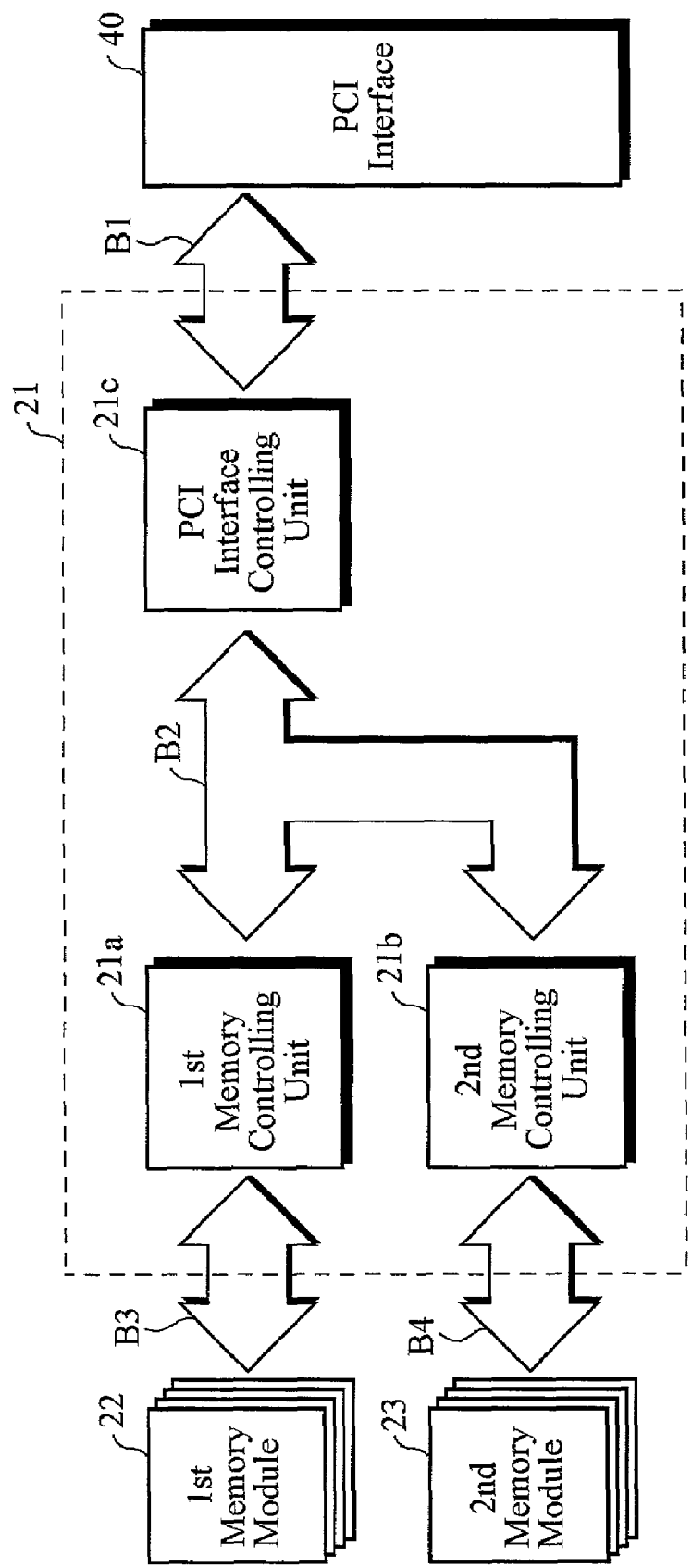
FIG. 2 is a detailed block diagram of the PCI-to-memory controller shown in FIG. 1 in accordance with a preferred embodiment of the present invention.

FIG. 2 is a detailed block diagram of the PCI-to-memory controller 21 shown in FIG. 1 in accordance with a preferred embodiment of the present invention.

As shown in FIG. 2, the PCI-to-memory controller 21 includes a first memory controlling unit 21a, a second memory controlling unit 21b and a PCI interface controlling unit 21c. The PCI interface controlling unit 21c, which functions as a bridge between the PCI interface bus 40 and the first and second memory controlling units 21a and 21b, processes a standard PCI command, control and data signal processing. Each of the first and second memory controlling units 21a and 21b performs a direct read/write operation for the sub-memory accessed in response to a PCI command provided from the PCI interface controlling unit 21c via a bus B2, and matches information of a cylinder, head, and sector of the HDD to addresses of memories so as to write the data to the memory. Specifically, the first memory controlling unit 21a, responsive to the PCI command provided from the PCI interface controlling unit 21c via the bus B2, performs a direct read/write operation for any sub-memory of the first memory module 22. The second memory controlling unit 21b, responsive to the PCI command provided from the PCI interface controlling unit 21c via the bus B2, performs a direct read/write operation for any sub-memory of the second memory module 23. On the other side, both of the first and second memory controlling units 21a and 21b control a high-capacity memory so that the activation of the overall memory requires a considerable amount of power consumption. As such, during the read/write operation of the memory, the first memory controlling unit 21a or the second memory controlling unit 21b activate only a memory corresponding to an address provided from the PCI interface controlling unit 21c and maintains the remaining memories in a low power mode. As a result, the power consumption may be minimized.

Figure 3:
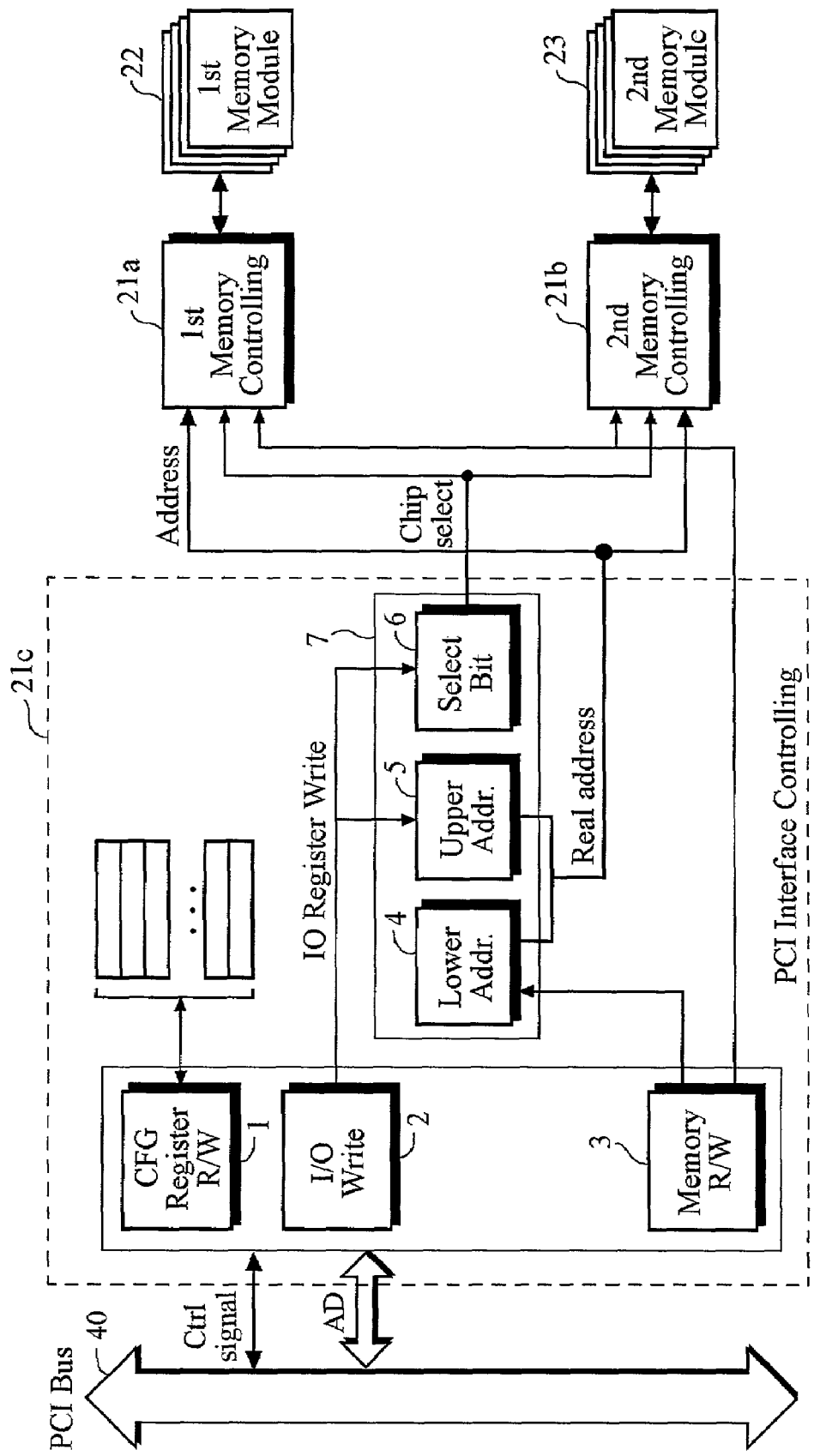
FIG. 3 is a detailed block diagram of the PCI interface controlling unit shown in FIG. 2 in accordance with a preferred embodiment of the present invention.

FIG. 3 is a detailed block diagram of the PCI interface controlling unit 21c shown in FIG. 2 in accordance with a preferred embodiment of the present invention. A detailed description of the internal operation algorithm of the PCI interface controlling unit 21c will be given with reference to FIG. 3.

As shown in FIG. 3, the PCI interface controlling unit 21c includes a configuration (CFG) register R/W 1, an I/O write 2, a memory R/W 3, and a register block 7 having a lower address bit 4, an upper address bit 5 and a select bit 6. Before designing the PCI interface controlling unit 21c, an address region, which CPU can perform addressing and is independent of operations of the peripheral devices, should be assigned in a memory map of CPU.

The lower address bit 4 of the register block 7 represents an address included in the address region within the memory map. During the design of the memory controlling unit 21c, the address range to be PCI interfaced is determined, and a bit range to be used for the lower address bit 4 is set, so that the lower address bit 4 is available.

The upper address bit 5 represents an address set to be used when a memory address region is beyond the address region in the memory map provided by the CPU. In the upper memory address bit 5, it is necessary to previously set a bit range based on a capacity range to be used during the design of the PCI interface controlling unit 21c.

The select bit 6 is used to directly access the memory modules and handle the fan-out to be occurred during the application of a single activation, thereby resulting in an increased memory expansion. From at least one bit to the maximum of the lower address bit 4 should be assigned to the select bit 6.

A description of the operation algorithm of the PCI interface controlling unit 21c will be given.

During the design of the PCI interface controlling unit 21c, the lower address bit 4, the upper address bit 5 and the select bit 6 are set based on a predetermined value. The I/O write 2 sets the upper address bit 5 on the register block 7 prior to accessing the memory by using a PCI memory read/write command among the PCI commands. During the memory access, the lower address bit 4 is accessed and the lower address bit 4 is concatenated with an upper address bit 5 of the register block 7, which is set through the I/O write 2. Thus, the sum of the upper address bit 5 and the lower address bit 4 is used as an access memory address bit. The most significant bit of the register block 7 is used to select any of the memory modules.

Specifically, in a CPU system with 32-bits address region for example, provided that the PCI interface controlling unit 21c is designed in conditions that the lower address bit 4 depending on the CPU is set to be 19-bits, the memory map region is set to be 1 Mbytes, the upper address bit to be I/O read and written is set to be 11-bits (i.e., 2048 bytes), and the select bit is set to be 2-bits, an available capacity of the PCI interface controlling unit may be calculated as 32 Gbytes as follows:

((1 Mbytes*2 Kbytes)*4 bytes)*4 bytes=32 Gbytes

In this manner, the application of the lower address bit, the upper address bit and the select bit to the 32-bits address region results in the capacity of 1,280,000 Tbytes. Similarly, if the address region is expanded into 64-bits, 128-bits or 512-bits address region, the memory having an astronomical capacity can be controlled.

Figure 4:
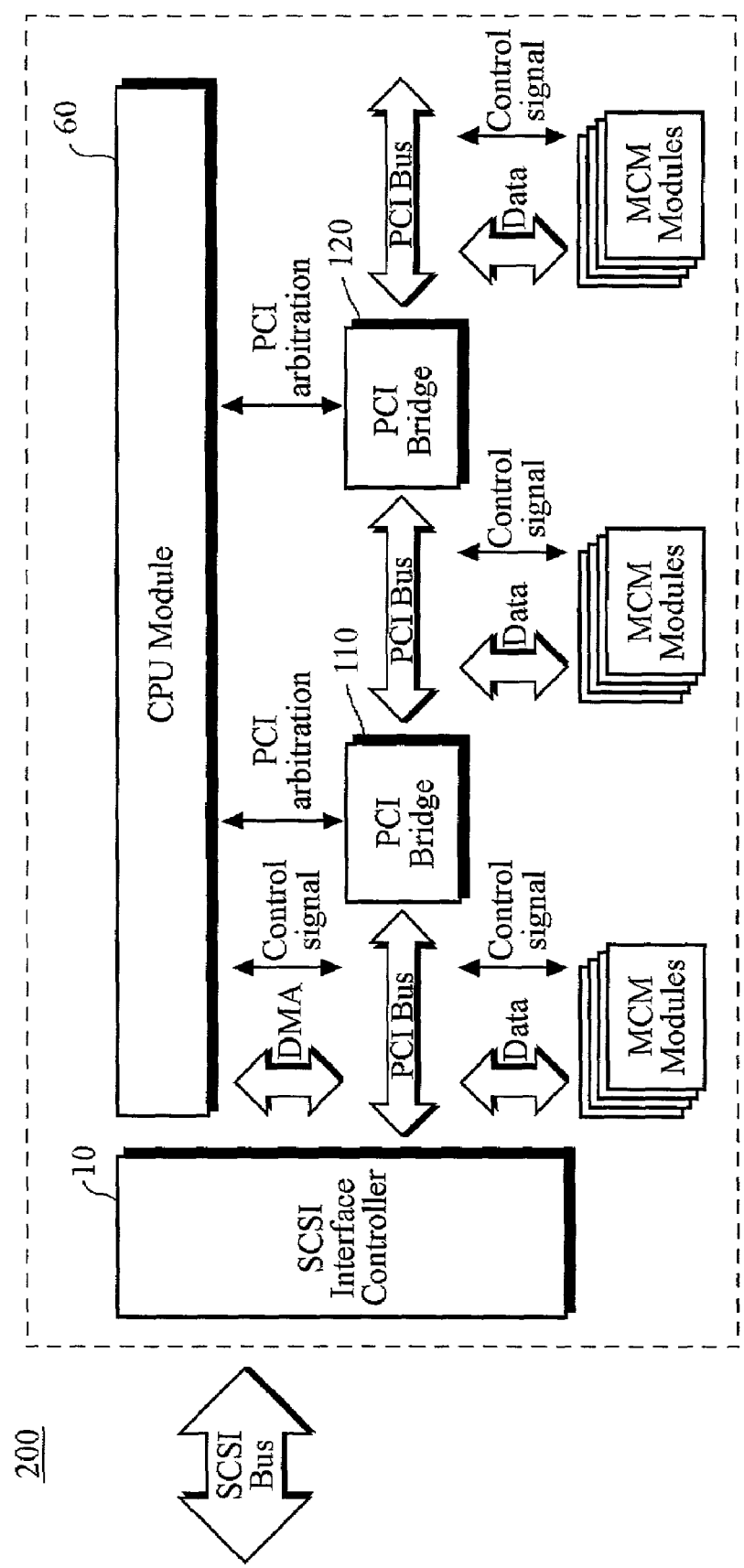
FIG. 4 is a schematic diagram of an expanded memory addressing system 200 in accordance with another embodiment of the present invention.

FIG. 4 is a schematic diagram of an expanded memory addressing system 200 in accordance with another embodiment of the present invention.

As shown in FIG. 4, a plurality of PCI bridges 110 and 120 are used to expand the system while minimizing a change in hardware, each of the PCI bridges being provided between the PCI buses. In accordance with the present invention, although the SCSI controller is used based on Ultra-160 SCSI scheme for a data transmission between an external interface bus and the PCI interface bus, another data bus transmission scheme such as an IDE (Integrated Device Electronics), ATA (Advanced Technology Attachment) or IEEE (Institute of Electrical and Electronics Engineers) 1394 may be used in lieu of the SCSI.

As demonstrated above, the present invention employing the hierarchical memory configuration, automatically activates individual SDRAM control blocks, which are not accessed in a low power mode, which, in turn, results in minimized power consumption and a low power activation.

Furthermore, in accordance with the present invention, as the address region of the lower address bit, upper address bit and the select bit is expanded into 64-bits, 128-bits, 512-bits address region, the memory having an astronomical capacity can be controlled by CPU.

Also, in accordance with the present invention, the memory is accessed instead of accessing the HDD. This is accomplished by converting data position information in the HDD into corresponding memory addresses so that a data access time is minimized to the order of several nanoseconds due to removal of data seek time required in the HDD. Furthermore, the present invention employs a PCI 66 MHz/64 bit bus to access internal memories, thereby supporting a transmission rate of 528 Mbytes/second at maximum, which, in turn, meets the maximum transmission rate of the high-performance SCSI bus.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. A system for addressing a data storage unit used in at least one of server and client computers, which comprises:
    means for converting a format of data on an external bus such that the data are accessed on an internal bus for use in the system;
    a memory card module connected to the internal bus for storing data transmitted through the internal bus, wherein the memory card module includes a plurality of memory modules each having a plurality of equally-sized memory blocks, each memory block being divided into a predetermined number of equally-sized sub-memories such that the memory module has a hierarchical memory configuration, wherein the memory card module includes a PCI-to-memory controller, which is disposed between the internal bus and the memory module as a bridge, for controlling access to the plurality of sub-memories, and
    wherein the PCI-to-memory controller includes:
        a PCI interface controlling unit for performing a standard PCI command, control and data signal processing, the PCI interface controlling unit including a register block having a lower address bit, an upper address bit and a select bit, wherein the lower address bit represents addresses included in the range of an address region within a memory map, the upper address bit represents an address set to be used when a memory address region is beyond the address region of the memory map, and the select bit is used to directly access the memory module; and
        a plurality of memory controlling units for performing a direct read/write operation for the sub-memories in response to the PCI command from the PCI interface controlling unit; and
        means for writing data on the internal bus to the memory module and reading out the data therefrom.

2. The system of claim 1, wherein the internal bus is a PCI (Peripheral Component Interconnect Bus) interface bus.

3. The system of claim 1, wherein the external bus is a SCSI (Small Computer System Interface) bus.

4. The system of claim 1, wherein the memory card module is composed of any one of SDRAM(Synchronous Dynamic Random Access Memory), rambus DRAM(Dynamic Random Access Memory), DDR(Double Data Rate) or other equivalent memories.

5. The system of claim 1, wherein the predetermined number is four.

6. The system of claim 1, wherein the PCI-to-memory controller activates any of the plurality of sub-memories to be actually accessed and maintains the remaining in a low power mode.

* * * * *